United States Patent
Caruncho Rodado

(10) Patent No.: US 8,523,999 B2
(45) Date of Patent: Sep. 3, 2013

(54) MATERIAL FOR ABSORPTION AND ATTENUATION OF NEUTRONS

(75) Inventor: Juan Manuel Caruncho Rodado, La Coruña (ES)

(73) Assignee: Arraela, S. L., La Coruna (ES)

( * ) Notice: Subject to any disclaimer, the term of this patent is extended or adjusted under 35 U.S.C. 154(b) by 0 days.

(21) Appl. No.: 13/542,033

(22) Filed: Jul. 5, 2012

(65) Prior Publication Data
US 2013/0008350 A1    Jan. 10, 2013

(30) Foreign Application Priority Data
Jul. 8, 2011  (ES) .................................. 201131165

(51) Int. Cl.
| C04B 28/06 | (2006.01) |
| C04B 22/00 | (2006.01) |
| C04B 14/36 | (2006.01) |
| C04B 7/32 | (2006.01) |
| G21F 1/04 | (2006.01) |

(52) U.S. Cl.
USPC ......... 106/695; 106/782; 106/815; 250/518.1

(58) Field of Classification Search
USPC ....................... 106/695, 782, 815; 250/518.1
See application file for complete search history.

(56) References Cited

U.S. PATENT DOCUMENTS 6,630,683 B2 * 10/2003 Vanvor ....................... 250/518.1
6,869,987 B2 *  3/2005 Mills et al. ........................ 524/2

FOREIGN PATENT DOCUMENTS

JP    2005139010 A  *  6/2005

OTHER PUBLICATIONS

Secar® 51 Product Data Sheet, Reference PDS-US-S51-8/06 (Updated Aug. 24, 2006).*

* cited by examiner

*Primary Examiner* — Anthony J Green
(74) *Attorney, Agent, or Firm* — Wenderoth, Lind & Ponack, L.L.P.

(57) ABSTRACT

Masses for obtaining poured concrete, concrete for bricks, concrete for tiles or mortar are known, in which Portland cement and Colemanite, water and additives to regulate the process are involved as aggregate.

The invention achieves a remarkable increase in the capacity of neutron radiation protection of the material. For this, Portland cement is replaced by Alumina cement and a new component is inserted into the mass, specifically anhydrous calcium sulfate, the Colemanite staying as aggregate.

1 Claim, 1 Drawing Sheet

MATERIAL FOR ABSORPTION AND ATTENUATION OF NEUTRONS

OBJECT OF THE INVENTION

The present invention relates to a mass which is specially designed for the manufacture of high-capacity neutron radiation protection products, such as concrete, bricks, tiles and mortars.

The object of the invention is to obtain a mass having a high homogeneity, with an optimum barrier effect against neutrons of various energies, allowing a significant reduction of the thickness of shielding barriers in comparison with standard materials for achieving the same barrier effect against said radiation.

It is also an object of the invention to cause and/or increase the neutron absorption effect of this material in various energies, and to eliminate or significantly reduce the effect of neutron scattering indoors, thus that in the case of the cancer treatment bunkers, it would mean that the patient would only receive the neutrons received directly from the main beam, those received by the scatter effect being eliminated. The electronics and room control systems also take advantage of this feature, and also a significant reduction in the shielding of the bunker door is allowed, among other beneficial aspects.

The invention is applicable to any radiological protection system, such as containers and/or mobile barriers of radioactive facilities, radiotherapy bunkers, or any facility where the existence of neutrons is expected.

BACKGROUND OF THE INVENTION

Concrete with capacity of radiation protection has, in addition to the usual cement components, water and chemical additives which vary according to the desired characteristics, such as resistance, setting time, protection against freezing, assurance of the absence of cracking, marine environment, etc., and an aggregate that makes them different from conventional concrete.

The problem posed by this type of concrete is that, in order to provide good radiation protection properties, a considerable wall thickness is required; accordingly, a negative impact on weight, space, and cost arises, since the hydrogen content in such concrete is usually low.

In an attempt to solve this problem, Spanish patent application number P 200900481 and publication number ES 2 344 290 is known; this document describes a mass for the manufacture of products with a high neutron radiation protection capacity, said mass, as any conventional concrete, being formed by cement, aggregates, water and chemical additives that change the characteristics of the concrete, with the particularity that said mass uses Colemanite with a very continuous grain size as an aggregate for obtaining a mass with a perfect homogeneity, thus allowing for obtaining a barrier effect against neutron radiation allowing to significantly reduce the wall thickness without diminishing the barrier effect.

More specifically, said Patent envisaged the use of Portland cement, water, Colemanite and additives.

The applicant of this Patent has discovered that the results obtained with the same can be clearly improved through the use of new components in the mass in question.

DESCRIPTION OF THE INVENTION

According to a feature of the invention, the mass comprises, instead of the aforementioned Portland cement, Alumina cement ($Al_2O_3$). The Alumina content in the cement is comprised between 36% and 45%, and it can reach 70%, depending on the availability of this type of product, and controlling the capacity of reaction with calcium sulfate.

According to another feature of the invention, the mass further comprises a new component that is introduced, particularly anhydrous calcium sulfate ($CaSO_4$). This sulfate must have a high degree of purity.

The use of Colemanite aggregate ($Ca_2B_6O_{11}\ 5H_2O$), which is a calcium borate, is maintained, and also the chemical additives needed for a proper production and installation or casting are maintained.

The new material, i.e. the new composition of the mass, has the following volumetric distribution:

Alumina cement between 4 and 5%.
Water between 17 and 18%.
Anhydrous calcium sulfate between 5 and 5.5%.
Colemanite between 72 and 73.5%.
Additives of the order of 0.02%.

From a suitable combination between the cement with a high content of Alumina and the anhydrous calcium sulfate, a quick crystallization of Ettringite ($3CaO\ Al_2O_3\ 3CaSo_4\ 32H_2O$) is obtained, therefore causing a significant increase in the number of hydrogen molecules which is very effective for capturing neutrons, mainly the fast neutrons, absorbing them or thermalizing them, these thermal neutrons being captured by the boron contained in the mixture.

BRIEF DESCRIPTION OF THE DRAWINGS

In order to complement the present description and with the object of allowing the reader to better understand the features of the invention according to a preferred example of a practical embodiment of the same, a set of drawings is herewith presented a part of the description where, with illustrative character and without limitation, the following is represented.

EXAMPLE OF PREFERRED EMBODIMENT OF THE INVENTION

In a practical embodiment of the mass or material, the following mixture expressed in volume has been carried out:

Alumina cement . . . 4.5%
Water . . . 17.5%
Anhydrous calcium sulfate . . . 5.23%
Colemanite . . . 72.75%
Additives . . . 0.02%

These figures may suffer a 10% variation either as an increase or as a decrease, depending on the production processes to be used, curing, fraction of the aggregate to be used, and the main objectives such as radiation protection coefficients, mechanical strength of the mass, cracking, etc.

In case the granulometric fraction of Colemanite is small in size, specifically when the maximum size of the aggregate in the fraction is less than 8 or 10 mm, dosage variations in the previous formulation may be even greater than 10%, due to the solubility of Colemanite in water.

Density is not a parameter pursued in a specific way, and it will be the result of the optimization of the mixture. However it will be around 2.1 $Kg/dm^3$.

As previously mentioned, the heavy mass proposed by the invention allows for obtaining concrete for pouring, concrete for bricks, concrete for tiles or dry mortar.

Figure 1:
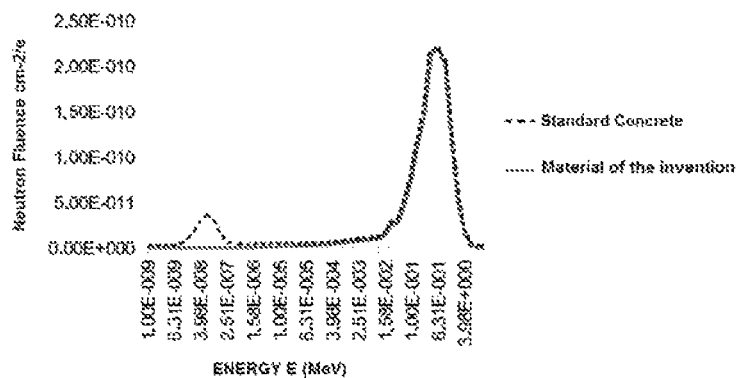
FIG. 1—Shows a graph where the fluence of the neutrons in the isocenter of a bunker with simple labyrinth is shown, wherein the walls of the same have been lined with the mass object of the invention, with a thickness of 5 cm.
Figure 2:
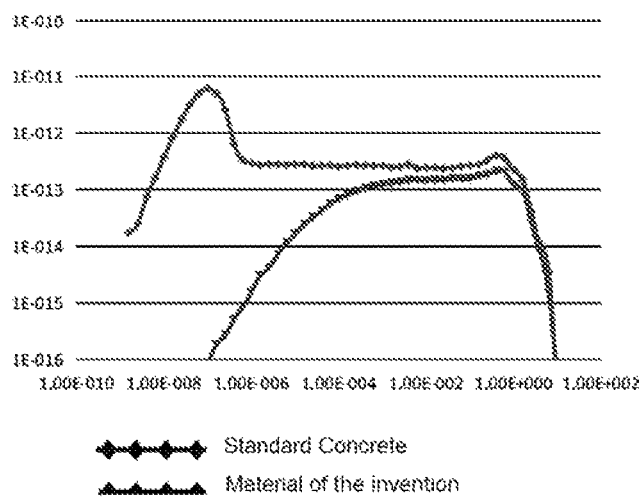
FIG. 2—Shows a plot similar to FIG. 1, but in the center of the corridor of the labyrinth.

The results obtained with the invention are clearly shown in the graphs shown in FIGS. 1 and 2.

The invention claimed is:

1. A material for the absorption and attenuation of neutrons, characterized by having the following volume composition: alumina cement between 4% and 5%, water between 17% and 18%, anhydrous calcium sulfate between 5% and 5.5%, colemanite between 72% and 73.5%, and approximately 0.02% of additives.

* * * * *